UNITED STATES PATENT OFFICE.

FREDERIC H. L. C. SACC, OF NEUFCHATEL, SWITZERLAND.

IMPROVEMENT IN PROCESSES OF PRESERVING EGGS.

Specification forming part of Letters Patent No. 170,494, dated November 30, 1875; application filed November 4, 1875.

*To all whom it may concern:*

Be it known that I, FREDERIC H. L. C. SACC, of Neufchatel, in the Swiss Republic, have invented a certain new and useful Process of Preserving Eggs, of which the following is a specification:

My process of preserving eggs is based upon the employment of siccative oils as a coating for eggs, to prevent both evaporation of the liquid portion of the egg, and the entrance into the egg of air and the fermentative bodies which it contains.

At the present time I prefer to use for this purpose the oil of poppies, but I can make use of all siccative oils.

In carrying out my process I plunge the eggs in the oil, where they remain for about one minute. I then remove them from the oil, and allow them to remain for twenty-four hours in the open air, after which they may be packed in any suitable way.

This process I have found by long-continued trial to be entirely effectual for the preservation of eggs.

I am aware that it has been often proposed to provide eggs with an impervious coating of fatty and resinous matters, varnishes, &c. I am not aware, however, that it has been proposed to use siccative oils, while I find that these oils are absolutely effective for the purpose, and besides can be provided at so small a cost as to render the process economical and available at a trifling expense.

What I claim as my invention, and desire to secure by Letters Patent, is—

The process of preserving eggs by coating them with siccative oils, substantially in the manner set forth.

In testimony whereof I have hereunto signed my name this 3d day of November, A. D. 1875.

FREDERIC SACC.

Witnesses:
R. A. PIPER,
W. H. L. LEE,
M. GAULHEW.